United States Patent
Broy et al.

(10) Patent No.: US 11,867,092 B2
(45) Date of Patent: Jan. 9, 2024

(54) SYSTEM HAVING A COMBUSTION POWER PLANT AND AN ELECTROLYSIS UNIT, AND METHOD FOR OPERATING A SYSTEM OF THIS TYPE

(71) Applicant: Siemens Energy Global GmbH & Co. KG, Munich (DE)

(72) Inventors: Alexander Broy, Fürth (DE); Gerald Franz Giering, Kalchreuth (DE); Alexander Rentschler, Bensheim (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/909,489

(22) PCT Filed: Mar. 6, 2020

(86) PCT No.: PCT/EP2020/056042
§ 371 (c)(1),
(2) Date: Sep. 6, 2022

(87) PCT Pub. No.: WO2021/175441
PCT Pub. Date: Sep. 10, 2021

(65) Prior Publication Data
US 2023/0112330 A1 Apr. 13, 2023

(51) Int. Cl.
*F01K 23/10* (2006.01)
*C25B 1/04* (2021.01)
(Continued)

(52) U.S. Cl.
CPC .............. *F01K 23/101* (2013.01); *C25B 1/04* (2013.01); *C25B 15/08* (2013.01); *F01K 13/02* (2013.01);
(Continued)

(58) Field of Classification Search
CPC .... F02C 6/04; F02C 6/18; F01K 23/10; F05D 2220/32
See application file for complete search history.

(56) References Cited

U.S. PATENT DOCUMENTS 9,328,426 B2 * 5/2016 Oppenheim .............. C25B 1/04
10,208,665 B2 * 2/2019 Simpson .................. C25B 9/73
(Continued)

FOREIGN PATENT DOCUMENTS

DE 102009048455 A1 4/2011
DE 102012013076 A1 1/2014
(Continued)

*Primary Examiner* — Thuyhang N Nguyen
(74) *Attorney, Agent, or Firm* — Laurence A. Greenberg; Werner H. Stemer; Ralph E. Locher

(57) ABSTRACT

A system includes a combustion power plant for generating power and an electrolysis unit for producing hydrogen. The combustion power plant has a combustion chamber for combustion of a fuel and an offgas conduit for leading off hot offgases formed in the combustion of the fuel. The offgas conduit is thermally coupled to the electrolysis unit. A method for operating the system includes burning the fuel in the combustion power plant, forming the hot offgases in the combustion of the fuel, removing the hot offgases through the offgas conduit, feeding the thermal energy of the hot offgases from the offgas conduit to the electrolysis unit, and producing hydrogen in the electrolysis unit by using the thermal energy from the hot offgases.

11 Claims, 1 Drawing Sheet

(51) Int. Cl.
  *C25B 15/08* (2006.01)
  *F01K 13/02* (2006.01)
  *F01K 25/00* (2006.01)

(52) U.S. Cl.
  CPC ........ *F01K 25/005* (2013.01); *F05D 2220/72* (2013.01)

(56) References Cited

U.S. PATENT DOCUMENTS

| | | | |
|---|---|---|---|
| 2008/0137797 A1 | 6/2008 | Peter | |
| 2013/0042626 A1 | 2/2013 | Johnston | |
| 2013/0125525 A1* | 5/2013 | Hein | F01K 23/10 60/659 |
| 2014/0203557 A1* | 7/2014 | Kim | F01K 23/101 60/39.12 |
| 2015/0226119 A1* | 8/2015 | Tanimura | F02C 3/04 60/39.12 |

FOREIGN PATENT DOCUMENTS

| | | | | |
|---|---|---|---|---|
| DE | 102015209875 A1 | | 12/2016 | |
| DE | 102015226111 A1 | * | 6/2017 | ......... C07C 29/1518 |
| DE | 102015226111 A1 | | 6/2017 | |
| EP | 2360230 A1 | | 8/2011 | |
| WO | WO 2011120706 A1 | | 10/2011 | |

* cited by examiner

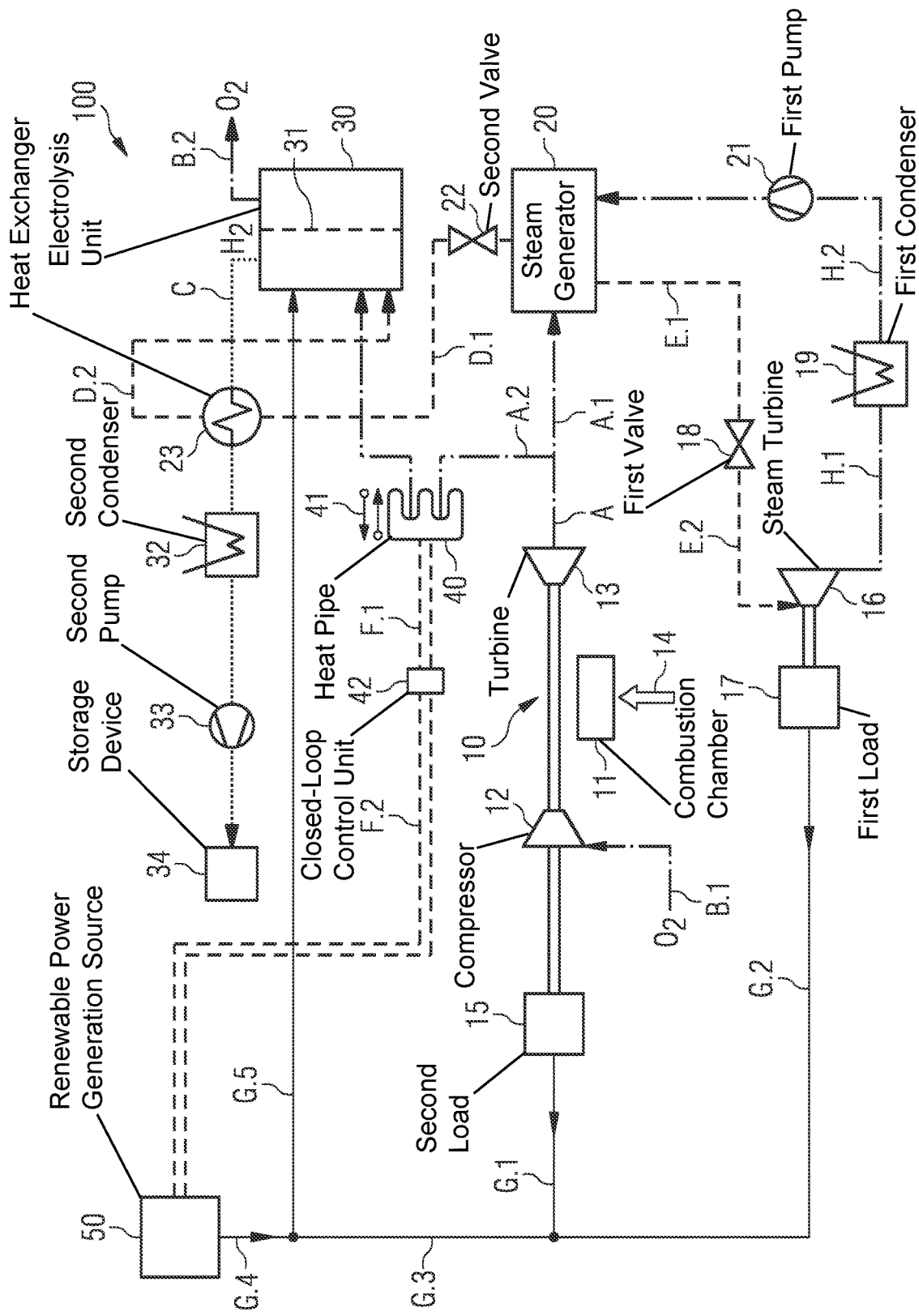

US 11,867,092 B2

SYSTEM HAVING A COMBUSTION POWER PLANT AND AN ELECTROLYSIS UNIT, AND METHOD FOR OPERATING A SYSTEM OF THIS TYPE

FIELD AND BACKGROUND OF THE INVENTION

The invention relates to a system comprising a combustion power plant and an electrolysis unit, and to a method of operating such a system.

Electrolysis units split steam into oxygen and hydrogen with the aid of a membrane which is permeable to oxygen ions, across which a sufficiently high voltage is applied. The electrolysis cells of the electrolysis unit in which the operation takes place typically require a high temperature exceeding 750° C. One factor on which the temperature depends is the material used in the electrolysis cells. The steam can be heated by repeated electrical heating and by means of heat exchangers that draw heat from the oxygen and hydrogen released in the electrolysis cell. This ensures that the gases released are correspondingly cooled for further utilization, and the energy expenditure for steam production is reduced. The gases released then have a relatively high residual moisture content. Technical devices may be utilized in order to condense out the remaining water component. The water can then be fed back to the electrolysis cells.

One application of electrolysis units is the production of hydrogen with the aid of power from renewable energies, or in other words from renewable generation. In this way, it is possible to store the fluctuating renewable energies in the form of hydrogen. However, the supply of electrolysis units with power from renewable energies, on account of their fluctuating character and as a result of the resultant fluctuations in temperature, results in shortening of the lifetime of the electrolysis unit.

SUMMARY OF THE INVENTION

It is therefore an object of the invention to operate an electrolysis unit in an advantageous manner, especially with a high efficiency, and in such a way as to achieve a high lifetime of the electrolysis unit.

The above object is achieved by the subject matter of the claims, especially by a system as described below and a method as described below. Further advantages and details of the invention will be apparent from the dependent claims, the description and the drawings. Features and details disclosed in connection with the system of the invention are of course also applicable in connection with the method of the invention, and so, with regard to the disclosure relating to the individual aspects of the invention, it is always possible to make reference in a reciprocal manner.

The stated object is achieved, in a first aspect, by a system comprising a combustion power plant for generation of power and an electrolysis unit for production of hydrogen, wherein the combustion power plant has a combustion chamber for combustion of a fuel and an offgas conduit for leading off the hot offgases formed in the combustion of the fuel, and wherein the offgas conduit is thermally coupled to the electrolysis unit.

By virtue of the thermal coupling of the offgas conduit to the electrolysis unit, the heat or thermal energy from the hot offgases from the combustion power plant is provided as heat or thermal energy in the electrolysis unit. In this way, the waste heat from the offgas from the combustion power plant is utilized in an advantageous manner and a high efficiency is achieved in the production of hydrogen by means of the electrolysis unit. Moreover, the providing of the heat from the offgas from the combustion power plant can achieve a high lifetime of the electrolysis unit, since the electrolysis unit can be kept at a constant temperature by appropriate supply of the heat from the offgas.

The electrolysis unit may also be referred to as electrolyzer. The electrolysis unit may especially be a water electrolyzer. Moreover, the electrolysis unit may especially be a proton exchange membrane electrolyzer. The electrolysis unit may have multiple interconnected electrolysis cells. The multiple interconnected electrolysis cells may be combined into stacks. The electrolysis unit may comprise multiple stacks of this kind. The electrolysis unit may also take the form of a reversible fuel cell. The electrolysis unit may especially include solid oxide electrolyzer cells.

The electrolysis unit may especially take the form of a high-temperature electrolysis unit or a high-temperature electrolyzer. In this case, a portion of the enthalpy of reaction needed for the electrolysis is introduced in the form of heat. This has the effect the power demand for the electrolysis falls and hence a high efficiency is achieved.

The numerical designation of the units which is chosen here, for example of fluid conduit, valve or load, as first, second, third, fourth etc. is chosen merely by way of example for distinction of the individual units in the context of this patent application. The mention of a unit with its numerical designation does not imply that there needs to be a corresponding number of these units, or of the prior units in the numerical sequence thereof, for the invention. In this respect, it is only the patent claims that are crucial. If reference is made, for example, to a third fluid conduit in one of the patent claims, there is no need for there also to be a first and a second fluid conduit, unless required by that patent claim or a patent claim that refers back to it.

It may be the case that the offgas conduit is coupled thermally to the electrolysis unit by means of a heat pipe. The high heat flow density of the heat pipe permits transportation of large amounts of heat over a small cross-sectional area and minimization of transport losses.

It may further be the case here that the heat pipe takes the form of a heat pipe. Heat pipes make use of what is called the wicking principle in order to guide the condensed fluid back to the evaporator. This enables transfers of heat with high heat flow densities in any orientation of the heat pipe and hence high flexibility in the spatial arrangement of the components of the system.

It may also be the case that the electrolysis unit is electrically coupled to a renewable power generation source. The renewable power generation source enables storage of the renewable energies with their fluctuating character in the form of hydrogen for use at a later juncture.

It may further be the case that the system has an open-loop control device set up to control the rate of heat transfer from the offgas conduit to the electrolysis unit. In particular, the open-loop control device may be set up to adjust the rate of heat transfer to zero or to a maximum value. The open-loop control device may additionally be set up to adjust the rate of heat transfer to intermediate values between zero and the maximum value. The open-loop control device may, for example, have a valve or take the form of a valve. The open-loop control device may also take the form of an adjustment device for the heat pipe. The heat pipe may then be described as an adjustable heat pipe. The adjustable heat pipe may correspondingly be set up either to fully thermally couple the offgas conduit to the electrolysis unit, to partly thermally couple the offgas unit to the electrolysis unit and/or to thermally decouple them completely via adjustment. In the fully coupled state, the maximum rate of heat transfer from the offgas conduit by means of the heat pipe to the electrolysis unit is achieved. In a partly coupled heat pipe, a portion of the maximum rate of heat transfer is achieved, and no heat is transferred in the case of a decoupled heat pipe; the rate of heat transfer is accordingly zero. Accordingly, by appropriate open-loop control by means of the open-loop control device, it is possible in a simple manner to control the supply of thermal energy from the offgas from the combustion power plant to the electrolysis unit.

It may be the case here that the system has a closed-loop control device set up to compensate for any fluctuation in the operating temperature of the electrolysis unit that results from a fluctuation in a power supplied to the electrolysis unit by means of control exerted by the open-loop control device. Accordingly, the closed-loop control device, if less power is supplied to the electrolysis unit as a result of a fluctuation as can occur particularly in the case of supply with power from a renewable power generation source, can prevent lowering of the operating temperature of the electrolysis unit in an efficient manner by increasing the rate of heat transfer. If more power is supplied to the electrolysis unit as a result of a fluctuation, the closed-loop control device can in turn prevent a rise in the operating temperature of the electrolysis unit by lowering the rate of heat transfer. In the case of an adjustable heat pipe, the closed-loop control device can control the heat pipe correspondingly by adjusting the adjusting device in order to control the rate of heat transfer correspondingly. The prevention of fluctuation in the operating temperature extends the lifetime of the electrolysis unit.

It may further be the case here that the closed-loop control device is set up to control the open-loop control device in such a way that a constant or essentially constant amount of hydrogen is produced by the electrolysis unit. The closed-loop control device correspondingly controls the open-loop control of the rate of heat transfer by means of the open-loop control device. This extends the lifetime and enables particularly efficient utilization of the electrolysis unit.

It may also be the case that the offgas conduit is thermally coupled to a steam generator set up to generate steam from the waste heat from the offgas, and the steam generator is coupled to the electrolysis unit by means of a first fluid conduit, wherein the first fluid conduit is set up to feed the steam generated from the waste heat in the steam generator to the electrolysis unit. The steam generator can thus be utilized for generation of hot steam by means of the waste heat from the offgas stream. This hot steam can advantageously be provided to the electrolysis unit in order to increase the efficiency of the electrolysis unit or of the overall system. It may be the case here that either the heat pipe or the steam generator or both is/are supplied with the thermal energy from the offgas from the combustion power plant. In accordance with the open-loop control exerted by the open-loop control device, it is possible to feed a portion of the heat from the offgases to the electrolysis unit, especially by means of the heat pipe, and a portion of the heat from the offgases to the steam generator.

It may be the case here that the first fluid conduit is coupled by means of a heat exchanger to a fourth fluid conduit, wherein the fourth fluid conduit is coupled to the electrolysis unit and is set up to remove the hydrogen produced in the electrolysis unit. In other words, the first or.

It may be the case here that the first fluid conduit is coupled by means of a heat exchanger to a fourth fluid conduit, wherein the fourth fluid conduit is coupled to the electrolysis unit and is set up to remove the hydrogen produced in the electrolysis unit. In other words, the first fluid conduit is coupled by means of the heat exchanger to the fourth fluid conduit for heating purposes or for heat exchange. In this way, the hydrogen which is still hot after production thereof can release its heat by means of the heat exchanger to the steam in the first fluid conduit, in order to increase the efficiency of the electrolysis process.

It may also be the case here that the steam generator is coupled to a steam turbine of the combustion power plant by means of a second fluid conduit which is set up to expand the steam generated in the steam generator from the waste heat from the offgas, wherein the steam turbine is coupled to a first load and wherein the steam turbine is coupled to the steam generator by means of a third fluid conduit for recycling the steam expanded in the steam turbine. The second fluid conduit and the third fluid conduit are thus each coupled, especially in a fluidic manner. This allows the thermal energy from the offgas to be utilized alternatively for supply of the electrolysis unit with steam to drive the steam turbine. The load may be an electrical generator. In this way, it is possible to utilize the heat from the offgases to generate power.

It may also be the case that a fifth fluid conduit is coupled to the electrolysis unit and the combustion power plant, in which case the fifth fluid conduit is set up to feed the oxygen produced in the electrolysis unit to the combustion power plant for the combustion of the fuel. The fifth fluid conduit is thus coupled, especially in a fluidic manner. This allows the oxygen produced by the electrolysis unit to be utilized for combustion in the combustion power plant and hence the efficiency of the system to be increased further.

It may further be the case that the combustion power plant takes the form of a gas turbine or a refuse power plant. The gas turbine used may be a gas-and-steam combined cycle power plant. The gas turbine may be operated, for example, in a humid air turbine process or a Cheng cycle. In these combustion power plants, a large amount of waste heat is obtained in the offgases, which is rendered utilizable in the system.

The object stated at the outset is achieved in a second aspect by a method of operating a system according to the first aspect of the invention, wherein the method has the following steps:
(a) burning the fuel in the combustion power plant,
(b) forming the hot offgases in the combustion of the fuel,
(c) removing the hot offgases by means of the offgas conduit,
(d) feeding the thermal energy of the hot offgases from the offgas conduit to the electrolysis unit and
(e) producing hydrogen in the electrolysis unit using the thermal energy from the hot offgases.

It may be the case that the method further comprises the following steps: supplying power to the electrolysis unit and compensating for any fluctuation in the operating temperature of the electrolysis unit that results from any fluctuation in the power supplied to the electrolysis unit, by means of control exerted by the open-loop control device.

It may further be the case that the open-loop control device is controlled in such a way that a constant or essentially constant amount of hydrogen is produced.

Further measures that improve the invention will be apparent from the description that follows with regard to a working example of the invention, shown in schematic form in the FIGURE. All the features and/or advantages that are apparent from the claims, the description or the FIGURE, including construction details and spatial arrangements, may be essential to the invention either on their own or in the various combinations. The invention is elucidated in detail hereinafter with reference to the appended drawing.

BRIEF DESCRIPTION OF THE FIGURE

The FIGURE shows a schematic view of a system 100 according to a working example of the invention.

DETAILED DESCRIPTION OF THE INVENTION

The system 100 comprises a combustion power plant 10 and an electrolysis unit 30. In the present context, the combustion power plant 10 takes the form of a gas-and-steam combined cycle power plant. The combustion power plant 10 accordingly has a compressor 12 coupled to a turbine 13. A combustion chamber 11, which receives fuel 14, is connected upstream of the turbine 13. In addition, the combustion power plant 10 has a steam turbine 16.

The electrolysis unit 30 takes the form of a high-temperature electrolyzer. The electrolysis unit 30 has multiple electrolysis cells and at least one membrane 31, indicated in FIG. 1. The membrane 31 is permeable to oxygen ions. By application of a sufficiently high voltage by means of the power line G, in the present case power branch G.5, across the at least one membrane 31, steam H2O supplied by means of a first fluid conduit D, which can also be referred to as water or steam conduit D, is split into oxygen O2 and hydrogen H2.

The oxygen O2 produced is removed in a fifth fluid conduit B, which can also be referred to as oxygen conduit and which is identified as B.2 in the present context. This oxygen O2 produced can advantageously be fed to the compressor 12 by means of the fifth fluid conduit B, identified as B.1 in the present context, in order to increase the efficiency of the system 100.

The hydrogen H2 is removed in a fourth fluid conduit C, which can also be referred to as hydrogen conduit, by means of a heat exchanger 23, a second condenser 32 and a second pump 33. The fourth fluid conduit C in the present context leads to a storage means 34 for hydrogen H2. By means of the heat exchanger 23, heat is exchanged between hot hydrogen H2 produced from the electrolysis unit 30 and the steam H2O in the first fluid conduit D. For this purpose, the first fluid conduit D leads from a steam generator 20 to the heat exchanger 23, in the present context with a first section D.1 of the first fluid conduit D, and from the heat exchanger 23 to the electrolysis unit 30, in the present context with a second section D.2 of the first fluid conduit D.

The power supplied to the electrolysis unit 30 may come from various sources. It may especially be the case that the electrolysis unit 30 draws power from a renewable power generation source 50. In the present context, this is shown by the connection of the power line G by means of the power line branches G.4, G.5 of renewable power generation source 50 and electrolysis unit 30. It is also possible for the combustion power plant 10 to have the second load 15, which may take the form of an electrical generator. For instance, the power generated by the second load 15 of the combustion power plant 10 can be supplied to the electrolysis unit 30 by means of the power line branches G.1, G.3, G.5. It is also possible for the steam turbine 16 to be coupled to a first load 17 in the form of an electrical generator. This too can supply power in this way to the electrolysis unit 30 by means of the power line branches G.2, G.3, G.5.

The steam generator 20 is thermally coupled to an offgas conduit A coupled to the turbine 13 of the combustion power plant 10, in the present context by means of a first offgas conduit branch A.1. Hot offgases from the combustion power plant 10 are transported in the offgas conduit A. The heat from these hot offgases is utilized in the steam generator 20. The steam generator 20 is set up to heat water to give steam and/or to heat steam. For this purpose, it can use power and/or the thermal energy from the offgases.

The steam generator 20 is coupled to the steam turbine 16 by means of a second fluid conduit E. The second fluid conduit E has a second fluid conduit section E.1 from the steam generator 20 to a first valve 18, and a second fluid conduit section E.2 from the first valve to the steam turbine 16. The first valve may correspondingly be opened in order to guide the heated steam to the steam turbine 16. In this way, it is possible to utilize the thermal energy from the offgases from the combustion power plant 10 for generation of power by means of the first load 17 in the form of an electrical generator. By means of a third fluid conduit H with the third fluid conduit sections H.1, H.2 and first condenser 19 disposed therein and first pump 21, the condensed water can be fed back to the steam generator 20, resulting in a closed circuit.

In addition, the steam generator 20 is coupled to the electrolysis unit 30 by means of the first fluid conduit D. A second valve 22 is disposed in the first fluid conduit D, to be exact in the first fluid conduit section D.1. When the second valve 22 is opened with the first valve 18 closed, the steam generated and heated with the aid of the thermal energy from the offgases can be provided at the electrolysis unit 30.

The offgas conduit A has a second offgas conduit branch A.2. The offgas conduit A is thermally coupled to the electrolysis unit 30 by means of the second offgas conduit branch A.2, in order to supply heat to the electrolysis unit 30 and hence to lower the power requirement of the electrolysis unit 30 for splitting of water. In the present context, the offgas conduit A is thermally coupled to the electrolysis unit 30 by means of a heat pipe 40. The heat pipe 40 in the present context takes the form of a heat pipe. In addition, the heat pipe 40 in the present context has an open-loop control device 41. The open-loop control device 41 enables open-loop control of the rate of heat transfer of the heat or thermal energy from the offgas in offgas conduit A from offgas conduit A to the electrolysis unit 30. In the present context, the open-loop control device 41 takes the form of an adjustment device 41. By adjusting the heat pipe 40, it is possible to thermally couple the offgas conduit A to the electrolysis unit 30, and to decouple them. As a result, the adjustment of the heat pipe 40 makes it possible to determine whether heat from the offgas is or is not supplied to the electrolysis unit 30 by means of the heat pipe 40.

The open-loop control device 41 is connected to a closed-loop control unit 42 for control purposes by means of a closed-loop control conduit F, in the present context closed-loop control conduit section F.1. The closed-loop control device 42 controls the open-loop control exerted by the open-loop control device 41. In addition, the closed-loop control device 42 is connected to the renewable power generation source 50 for control purposes by means of the closed-loop control conduit F, in the present context closed-loop control conduit section F.2. This makes it possible for the closed-loop control device 42 to react to fluctuations in the power supply to the electrolysis unit 30 by corresponding control exerted by the open-loop control device 41. This can avoid fluctuations in the operating temperature of the electrolysis unit 30, in order to increase the lifetime of the electrolysis unit 30. In addition, by appropriate closed-loop control of the rate of heat transfer, it is also possible for a constant or essentially constant amount of hydrogen to be produced by the electrolysis unit 30, even if the power supply is fluctuating.

The invention claimed is:

1. A system, comprising:
a combustion power plant for generating power and an electrolyzer for producing hydrogen;
said combustion power plant having a combustion chamber for combustion of a fuel and an offgas conduit for leading off hot offgases formed in the combustion of the fuel;
said offgas conduit being thermally coupled to said electrolyzer;
an open-loop controller configured to control a rate of heat transfer from said offgas conduit to said electrolyzer; and
a closed-loop controller configured to compensate for any fluctuation in an operating temperature of said electrolyzer resulting from a fluctuation in a power supplied to said electrolyzer by control exerted by said open-loop controller.

2. The system according to claim 1, which further comprises a heat pipe thermally coupling said offgas conduit to said electrolyzer.

3. The system according to claim 1, which further comprises a renewable power generation source electrically coupled to said electrolyzer.

4. The system according to claim 1, wherein said closed-loop controller is configured to control said open-loop controller to ensure that a constant amount of hydrogen is produced by said electrolyzer.

5. The system according to claim 1, which further comprises:
a steam generator thermally coupled to said offgas conduit to generate steam from waste heat from the offgas; and
a first fluid conduit coupling said steam generator to said electrolyzer;
said first fluid conduit configured to feed steam generated from waste heat in said steam generator to said electrolyzer.

6. The system according to claim 5, which further comprises:
a fourth fluid conduit coupled to said electrolyzer and configured to remove the hydrogen produced in said electrolyzer; and
a heat exchanger coupling said first fluid conduit to said fourth fluid conduit.

7. The system according to claim 6, wherein:
said combustion power plant includes a steam turbine;
a second fluid conduit couples said steam generator to said steam turbine, said second fluid conduit is configured to expand the steam generated in said steam generator from the waste heat from the offgas;
a first load is coupled to said steam turbine; and
a third fluid conduit couples said steam turbine to said steam generator for recycling steam expanded in said steam turbine.

8. The system according to claim 7, which further comprises:
a fifth fluid conduit coupled to said electrolyzer and to said combustion power plant;
said fifth fluid conduit configured to feed oxygen produced in said electrolyzer to said combustion power plant for the combustion of the fuel.

9. The system according to claim 1, wherein said combustion power plant is a gas turbine or a refuse power plant.

10. A method of operating a system, the method comprising:
providing the system according to claim 1:
burning the fuel in said combustion power plant;
forming the hot offgases in the combustion of the fuel;
removing the hot offgases by using the offgas conduit;
feeding thermal energy of the hot offgases from said offgas conduit to said electrolyzer;
producing hydrogen in said electrolyzer by using the thermal energy from the hot offgases;
providing the system with an open-loop controller configured to control a rate of heat transfer from said offgas conduit to said electrolyzer;
supplying power to said electrolyzer; and
compensating for any fluctuation in an operating temperature of said electrolyzer resulting from any fluctuation in the power supplied to said electrolyzer by control exerted by said open-loop controller.

11. The method according to claim 10, which further comprises controlling said open-loop controller to produce a constant amount of hydrogen.

\* \* \* \* \*